US012364883B2

(12) United States Patent
Winrow et al.

(10) Patent No.: US 12,364,883 B2
(45) Date of Patent: Jul. 22, 2025

(54) REUSABLE FILTERING FACE MASK

(71) Applicants: National Technology & Engineering Solutions of Sandia, LLC, Albuquerque, NM (US); Mayo Foundation for Medical Education and Research, Rochester, MN (US)

(72) Inventors: Edward G. Winrow, Albuquerque, NM (US); Katherine Anne Barrick, Bosque Farms, NM (US); Todd Andrew Barrick, Bosque Farms, NM (US); Victor H. Chavez, Edgewood, NM (US); Lorenzo Jiron, Sandia Park, NM (US); Thomas John Rogers, Albuquerque, NM (US); Eric A. Shaner, Rio Rancho, NM (US); Zachary Medaris Wilson, Albuquerque, NM (US); Devyani Lal, Scottsdale, AZ (US); John M. Angeli, Rochester, MN (US); Mark B. Wehde, Saint Paul, MN (US)

(73) Assignees: National Technology & Engineering Solutions of Sandia, LLC, Albuquerque, NM (US); Mayo Foundation for Medical Education and Research, Rochester, MN (US)

( * ) Notice: Subject to any disclaimer, the term of this patent is extended or adjusted under 35 U.S.C. 154(b) by 920 days.

(21) Appl. No.: 17/526,688

(22) Filed: Nov. 15, 2021

(65) Prior Publication Data

US 2022/0152433 A1 May 19, 2022

Related U.S. Application Data

(60) Provisional application No. 63/114,151, filed on Nov. 16, 2020.

(51) Int. Cl.
*A62B 23/02* (2006.01)
*A41D 13/11* (2006.01)

(52) U.S. Cl.
CPC .......... *A62B 23/02* (2013.01); *A41D 13/1107* (2013.01); *A41D 13/1161* (2013.01)

(58) Field of Classification Search
CPC ........... A62B 7/10; A62B 18/10; A62B 18/08; A62B 9/04; A62B 23/00–02; A62B 7/00;
(Continued)

(56) References Cited

U.S. PATENT DOCUMENTS

| | | | | |
|---|---|---|---|---|
| 2,742,039 A * | 4/1956 | Bloom | A62B 18/084 | 128/201.23 |
| 3,109,425 A * | 11/1963 | Gongoll | A62B 18/10 | 128/205.24 |

(Continued)

OTHER PUBLICATIONS

3M Commercial Literature, "Introducing the 3M Secure Click Half Facepiece Reusable Respirator," www.3M.com/reusable, 4 pages.

(Continued)

*Primary Examiner* — Rachel T Sippel
(74) *Attorney, Agent, or Firm* — Martin I. Finston; Mark A. Dodd

(57) ABSTRACT

A reusable, protective face mask has two detachable filter trays that attach on each side of the mask, a soft elastomeric face seal, and straps to go around the user's head. Exhalations and inhalations can pass through the same filter material. The filter trays can accept arbitrary filter media. A forward-facing port can be used to increase speech intelligibility by transmitting sound through a diaphragm without a prohibitive amount of distortion. Manufacture of the mask is facilitated because the mask body and the other mask components can be produced by injection molding. Decontamination and sterilization are facilitated because the mask can be fully disassembled.

15 Claims, 12 Drawing Sheets

(58) Field of Classification Search
CPC ............ A62B 18/00; A62B 18/02–025; A62B 18/084; A62B 18/088; A62B 9/00; A62B 19/00; A61M 16/00; A61M 16/06; A61M 39/00; A41D 13/11–1107; A41D 13/1161
USPC ............ 128/206.16, 206.17, 206.19, 206.21, 128/206.27
See application file for complete search history.

(56) References Cited

U.S. PATENT DOCUMENTS

| | | | | | |
|---|---|---|---|---|---|
| 4,414,973 | A * | 11/1983 | Matheson | A62B 18/00 128/206.17 |
| 4,850,346 | A | 7/1989 | Michel et al. | |
| 4,886,058 | A | 12/1989 | Brostrom et al. | |
| 5,385,141 | A * | 1/1995 | Granatiero | A62B 18/10 128/205.24 |
| 5,463,693 | A * | 10/1995 | Birli | H04R 5/02 381/75 |
| 5,732,695 | A | 3/1998 | Metzger | |
| 5,924,420 | A * | 7/1999 | Reischel | A62B 18/082 128/206.28 |
| 6,305,370 | B1 * | 10/2001 | Rosert | A62B 18/08 128/201.19 |
| 10,980,296 | B1 * | 4/2021 | Hosac | A62B 18/10 |
| 11,000,080 | B1 | 5/2021 | Hall | |
| 2002/0078953 | A1 * | 6/2002 | Fecteau | A62B 18/084 128/207.11 |
| 2006/0254592 | A1 | 11/2006 | Anders et al. | |
| 2013/0263848 | A1 * | 10/2013 | Feil | A62B 18/08 128/201.19 |
| 2016/0001109 | A1 * | 1/2016 | Kanno | A62B 18/08 181/167 |
| 2017/0021203 | A1 * | 1/2017 | Baker | A62B 7/12 |
| 2017/0080262 | A1 * | 3/2017 | Freres | H04R 1/028 |
| 2020/0054901 | A1 * | 2/2020 | Kudav | A62B 7/10 |
| 2020/0289859 | A1 * | 9/2020 | Malloy | A62B 18/10 |
| 2021/0023326 | A1 | 1/2021 | Heimbuch et al. | |
| 2021/0353975 | A1 * | 11/2021 | Tseng | A62B 9/04 |
| 2021/0370105 | A1 * | 12/2021 | Chen | A62B 23/02 |
| 2021/0379420 | A1 | 12/2021 | Somna et al. | |

OTHER PUBLICATIONS

3M Commercial Literature, "User Instructions, 3M Secure Click," www.3m.com/workersafety, 34 pages.
3M Commercial Literature, "3M Secure Click Half Facepiece Reusable Respirator with Speaking Diaphragm HF-801SD, Small, 10ea/Case," www.3m.com., 12 pages.
Dentec Commercial Literature, "Comfort Air Nx® MD," www.dentecsafety.com, 6 pages.
Alicia Lasek, "Ford's clear N95 face mask a game changer for healthcare, hearing impaired, company claims," McKnights Long-Term Care News (Feb. 5, 2021), https://www.mcknights.com/news/clinical-news/fords-clear-n95-face-mask-a-game-changer-for-healthcare-hearing-impaired-company-claims/, 4 pages.
Tiger Performance Commercial Literature, Honeywell NIOSH Approved 7600 Full Facepiece Respirator Filter Mask with Headband—P100 Filters & Tiger External Microphone, https://menloservice.sandia.gov/https://tigerperformance.com/honeywell-7600-niosh-approved-full-face-respirator-mask/honeywell-niosh-approved-7600-full-facepiece-respirator-filter-mask-with-headband-p100-filters-tiger-external-microphone.html, 4 pages.
Crotti, N., "3M, others may have unmasked a solution to future N95 shortages," Medical Design and Outsourcing (Mar. 30, 2021), https://www.medicaldesignandoutsourcing.com/3m-others-may-have-unmasked-a-solution-to-future-195-shortages/, 10 pages.
3M Technical Specification, 3M Secure Click Half Facepiece Reusable Respirator Series HF-800, Jan. 2020, 4 pages.
3M Technical document, Rugged Comfort Half Facepiece Reusable Respirator 6500 Series, 2 pages.
3M Technical document, Half Facepiece Respirator 6000 Series, Reusable, Issue date Jul. 1, 2009, 3 pages.
3M Catalog, 3M Ultimate FX Full Facepiece Reusable Respirator FF-400 Series, 8 pages.
Drager X-plore 2100, Drager Products & Solutions webpage, 8 pages.
Drager X-plore 3300/3500, Drager Products & Solutions webpage, 9 pages.
3M 6000 Series 6300Q Large Probed Reusable Respirator Assembly—Assembly with Headpiece—051138-28921, R. S. Hughes website, 2 pages.
Envo Mask Reusable Particulate Respirator User Instructions, 2 pages.
MSA Air-Purifying Respirators for Healthcare catalog, 8 pages.
MSA Safety Incorporated Press Release, 4 pages.
Sperian, Survivair Blue 1 Replacement Part Ordering Information, 1 page.
Honeywell North, HM500 Series Half Mask catalog, 4 pages.
Honeywell 7700 Series Half Mask, product details, 1 page.
North by Honeywell RU8500 Series Half Masks, Technical Data Sheet, 4 pages.
Honeywell 5500 Series Half Mask datasheet, 3 pages.
Dentec Comfort Air NX, product information webpage, 8 pages.
Dentec Comfort Air Half Mask Respirators online catalog, 20 pages.
Dentec Comfort Air Nx Md Reusable Respirator online catalog, 8 pages.
MSA Advantage 200 LS Half-Mask Respirator, product webpage (https://US.msasafety.com/Air-Purifying-Respirators-%28APR%29/Elastomeric-Half-Masks/Advantage%C2%AE-200-LS-Half-Mask-Respirator/p/000100000200001120), 3 pages.
MSA Advantage® 900 Elastomeric Half-Mask Respirator, product webpage (https://us.msasafety.com/Air-Purifying-Respirators-%28APR%29/Elastomeric-Half-Masks/Advantage%C2%AE-900-Elastomeric-Half-Mask-Respirator/p/000100000200001190), 3 pages.
MSA Advantage 420 Half-mask Respirator, product webpage (https://us.msasafety.com/Air-Purifying-Respirators-%28APR%29/Elastomeric-Half-Masks/Advantage%C2%AE-420-Half-Mask-Respirator/p/000100000200001150), 3 pages.
MSA Innovation, LLC, CDC The National Personal Protective Technology Laboratory Approval No. 9312, 2 pages.
PCT/US2021/059380 filed Nov. 15, 2021, International Search Report and Written Opinion mailed Feb. 2, 2022, 7 pages.
Screenshots from Youtube video, "Cleaning Your Envo Mask," s pages.
Screenshots from DentecSafety.com video, "How to Conduct Quantitative Fit Testing with the Comfort-Air Respirators," 2 pages.

* cited by examiner

REUSABLE FILTERING FACE MASK

CROSS-REFERENCE TO RELATED APPLICATION

This application claims priority to U.S. Provisional Application Ser. No. 63/114,151, filed Nov. 16, 2020 under the title, "REUSABLE FILTERING FACE MASK," the entirety of which is hereby incorporated herein by reference.

STATEMENT OF GOVERNMENT RIGHTS

This invention was made with United States Government support under Contract No. DE-NA0003525 between National Technology & Engineering Solutions of Sandia, LLC and the United States Department of Energy/National Nuclear Security Administration. The United States Government has certain rights in this invention.

FIELD OF THE INVENTION

The invention relates to protective face masks with air filtration.

ART BACKGROUND

There is a need in the medical community for personal protective equipment, including face masks, that is readily manufacturable, inexpensive, and convenient to use. Such a need has been underscored by critical equipment shortages during the COVID-19 pandemic.

N95 masks have been in particular demand for protection against pathogens. An N95 mask, also referred to as an N95 respirator, is a respirator that filters 95% of airborne particles in accordance with the NIOSH (U.S. National Institute for Occupational Safety and Health) N95 classification of air filtration.

To prevent the spread of infection, sanitary disposal of N95 masks has been commonplace. However, significant cost savings could be realized through the reuse of N95 masks and the like. Mask reuse would necessitate decontamination or sterilization. Although candidate designs for reusable N95 masks are under study, none to date have yet been certified for decontamination and reuse.

One obstacle to the adoption of reusable masks has been the difficulty of sterilizing them. Factors that interfere with sterilization may include, for example, complicated mask geometries and vulnerability of some of their parts to chemical or thermal damage.

Candidate designs for reusable masks that have been offered have not been uniformly acceptable. Some designs fail to meet OSHA (U.S. Occupational Safety and Health Administration) fit-test requirements, and some have failed to meet the NIOSH filtration requirements. The filter area in some designs is too small to prevent the user from becoming hypercapnic. (Hypercapnia is an excess of carbon dioxide in the blood, brought about, for example, by inadequate ventilation.) Some of the candidate designs have made inadequate provision for decontamination or sterilization.

There remains, accordingly, a need for a protective face mask that can perform as an N95 respirator and that meets Federal standards, and that is also reusable and fully capable of decontamination and/or of sterilization.

SUMMARY OF THE INVENTION

We have developed and demonstrated a concept for a reusable face mask that can function as an N95 respirator. It has a mask body similar to some that are used in commercially available half-mask respirators. The mask has two detachable filter trays that attach on each side of the mask, a soft elastomeric face seal, and straps to go around the user's head.

Although most conventional reusable respirators include an exhaust valve, our design does not include an exhaust valve as an essential component. Instead, we envisage that exhalations and inhalations can pass through the same filter material. The filter trays can accept arbitrary filter media.

There is a forward-facing port, positioned in front of the user's mouth, that can be used to increase speech intelligibility by transmitting sound through a diaphragm without a prohibitive amount of distortion. With removal of the diaphragm, the forward-facing port can be used for other purposes. For example, it can be used for certification testing without damage to the overall mask body. Also, if desired, the forward-facing port can be used for attachment of an exhaust valve.

Manufacture of the mask is facilitated because the mask body and the other mask components can be produced by injection molding. Decontamination and sterilization are facilitated because the mask can be fully disassembled.

Accordingly, the present disclosure relates to a protective face mask, comprising a mask body of elastomeric material, pierced through by two symmetrically placed filtration holes for placement of a filter medium over each said hole. The protective face mask further comprises two filter trays for receiving a filter medium into each said tray, each said tray having a recessed receiving area surrounded by a rim. The protective face mask further comprises two filter covers, each configured to engage the rim of a filter tray, and two filterports for admitting the passage of air between the filter trays and an interior portion of the mask body. Each filterport has a flange portion adapted to sealingly nest against an inner surface of the mask body, and it has a through portion adapted to protrude through a filtration hole from inside to outside the mask body.

The receiving area of each filter tray has a tray bottom face, and it has a tray rib pattern standing proud of the tray bottom face, whereby a lower air space is reserved beneath a received filter medium. Each of the filter covers has a cover inner face, and it has a cover rib pattern standing proud of the cover inner face, whereby a received filter medium is urged onto the tray rib pattern when the filter cover is sealed onto a filter tray, and whereby an upper air space is reserved between the cover inner space and the received filter medium.

The mask body comprises an integrally formed filter gasket ring around each of the two filtration holes.

The protective face mask further comprises two filter twist locks, each comprising a port twist-locking fixture on the through portion of one of the filterports and a complementary tray twist-locking fixture on one of the filter trays that is reversibly engageable with the port twist-locking feature. The filter twist locks are conformed such that during assembly of a filter tray and filterport to the mask body with the filter tray positioned over a filter gasket ring, engagement of a port twist-locking fixture with a tray twist-locking feature followed by relative rotation between said engaged features urges the filter tray toward the mask body and thereby compresses the filter gasket ring.

Each filter cover is pierced through with one or more vent holes for passage of air between the atmosphere and the upper air space within the corresponding filter tray. Each filter port is conformed with an opening for passage of air between the lower air space of a filter tray and the interior portion of the mask body.

The mask body, the filter trays, the filter covers, and the filterports are each a discrete part of the protective face mask. The protective face mask is capable of repeated assembly from the discrete parts and disassembly into the discrete parts.

In some embodiments, the mask body, the filter trays, the filter covers, and the filterports are assembled together. In other embodiments, the mask body, the filter trays, the filter covers, and the filterports are provided as separate parts in a kit for assembly.

In embodiments, the mask body is further pierced through by a forward-facing hole, the protective face mask further comprises an A-unit and a B-unit that, together, constitute a forward port, the A-unit has a flange portion adapted to nest against an inner surface of the mask body, a twist-locking fixture-A on the A-unit and a complementary twist-locking fixture-B on the B-unit are reversibly engageable and, together, constitute a forward twist lock, and the forward twist lock is conformed such that during assembly of the B-unit to the mask body, engagement of the twist-locking fixture-A with the twist-locking fixture-B followed by relative rotation between said engaged features urges the B-unit toward the mask body.

In some embodiments, the mask body, the filter trays, the filter covers, the filterports, the A-unit, and the B-unit are assembled together. In other embodiments, they are provided as separate parts in a kit for assembly.

In embodiments, the protective face mask further comprises a speech diaphragm that forms a seal over an open, forward-facing end of the B unit. For example, the speech diaphragm may have a rim that reversibly engages the open, forward-facing end of the B unit.

In embodiments, the B-unit comprises a flange portion that nests against an outer surface of the mask body around the forward-facing hole, and it further comprises an annular portion that is distal to the mask body. The protective face mask further comprises a harness having four attachment points and a clip stub projecting from each attachment point, the harness and clip stubs collectively constituting a clip assembly. Each of the clip stubs comprises a pliant, elongate member terminated by a clip for attachment of a head strap, and the harness has a central opening adapted to fit around the annular portion of the B-unit. The central opening of the harness may, for example, be smaller in diameter than the flange portion of the B-unit, such that, upon assembly, the harness at least partially covers said flange portion.

In embodiments having A-units and B-units as described above, the flange portion of the A-unit may have a middle panel and two side panels, with each side panel bent at an angle relative to the middle panel, the middle panel nesting against a front portion of the mask body, and the side panels nesting against side portions of the mask body. Further, distal the middle panel, each side panel may terminate in an arcuate edge that nests against a stop that is concentric with one of the filtration holes. Still further, each of the stops may be constituted by one of the filterports.

BRIEF DESCRIPTION OF THE DRAWINGS

FIG. 5 is a detail of FIG. 8, which is described below.

Throughout the figures, where reference numerals are repeated, they call out like elements.

DETAILED DESCRIPTION

Figure 1:
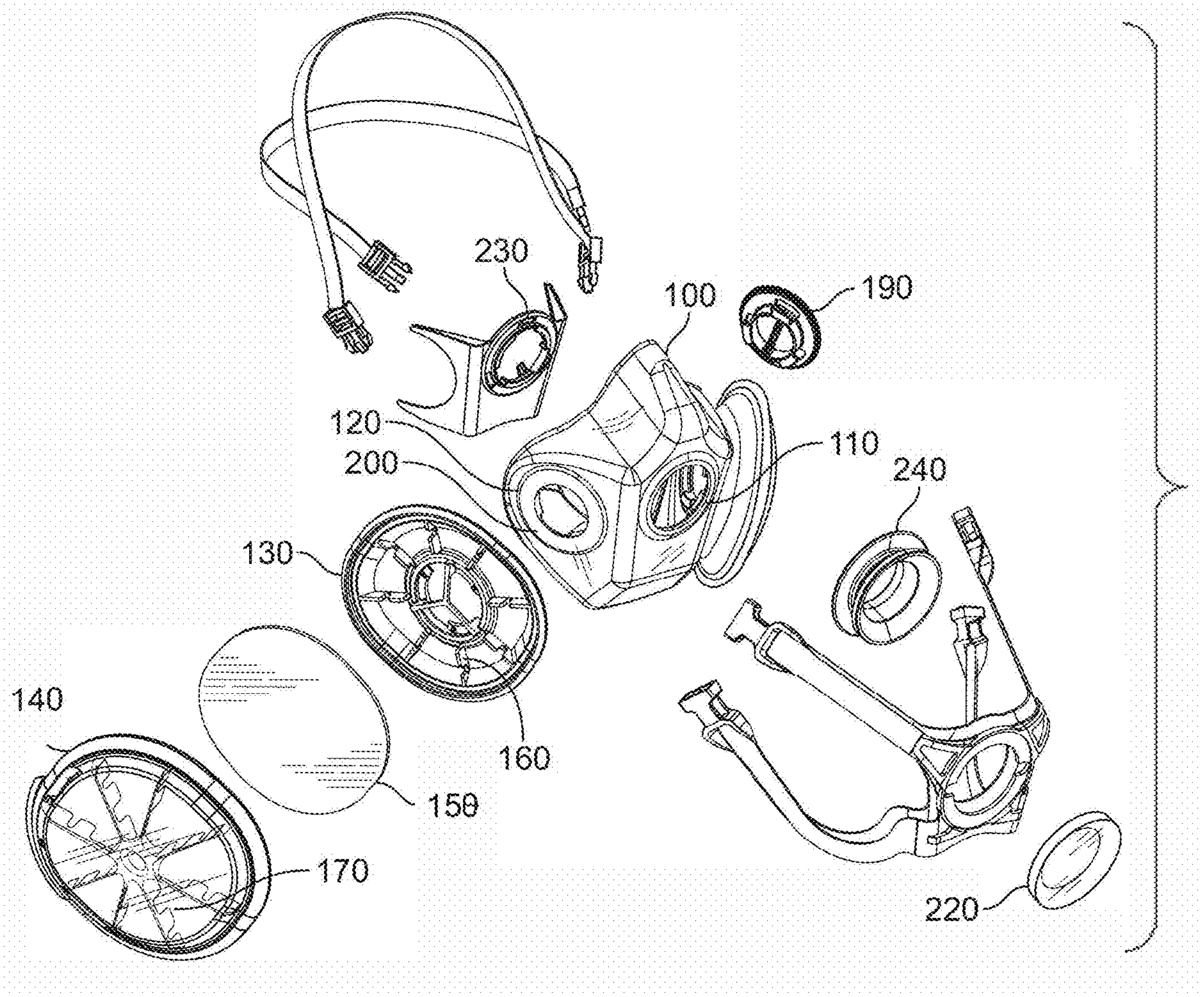
FIG. 1 is an exploded view of a mask according to an example embodiment of the invention.

FIG. 1 is an exploded view showing the component parts of our new mask in an example embodiment. At the center of the drawing is a mask body 100. The mask body is made of an elastomeric material that is compliant enough to make a seal against the wearer's face. In current embodiments, the mask body is made of silicone, although other suitable materials will also be known to those skilled in the art. One advantage of making this part from silicone is that it can readily be formed by injection molding.

As shown in FIG. 1, the example mask body has a frontal plane positioned generally between a portion contoured for receiving the wearer's nose and a portion contoured for receiving the wearer's chin. The example mask body is also seen to have left and right lateral planes roughly parallel to the wearer's cheeks. The frontal plane is pierced through with a hole 110 referred to here as the "forward-facing hole", and each lateral plane is pierced through with a hole 120 referred to here as a "filtration hole". It should be understood that the term "plane" as used in describing the above features is merely illustrative. Although these features may be substantially planar in some embodiments, they may in other embodiments have substantial curvature without departing from the principles described herein.

Also seen in the exploded view are two filter assemblies. Each filter assembly consists of a filter tray 130, a filter cover 140, and a replaceable filter medium 150. In the figure, one filter assembly is shown in parts, and the other is shown fully assembled. In embodiments, the filter cover is made of thermoplastic polyurethane (TPU), and the filter tray is made of a harder material such as acetal plastic or polycarbonate, although other suitable materials will be known to those skilled in the art. One advantage of making these parts from materials such as TPU, acetal, and polycarbonate is that they can readily be formed by injection molding.

In the process of assembling the mask, each filter tray is attached to the mask body in a manner to be described below. A filter medium is placed within the filter tray. In typical examples, the filter medium will be a pancake-shaped filter.

In the figure, it will be seen that the disassembled filter tray has a central aperture, an inner face, and a pattern of ribs 160 that stand proud of the inner face. The ribs prevent the filter medium from seating directly against the inner face of the tray. Instead, they create a lower air space between the central aperture and the full area of the filter medium. Scallops in the ribs permit unimpeded airflow between air vents pierced through the filter cover and the full area of the filter medium.

In the figure, it will also be seen that the filter tray has a rim. The rim is tall enough to stand above the edge of the filter medium. The importance of this will be explained below. The rim of the filter tray is conformed to grip the edge of the filter cover, which is conformed for that purpose in a complementary manner to the edge of the filter tray. Container seals of that kind are conventional and need not be described here in further detail, although one non-limiting example will be provided in a drawing below.

Although best seen in later figures, the filter cover also has a rim, an inner face, and a pattern of ribs 170 that stand proud of the inner face. The inner face of the disassembled filter cover is hidden in the view of FIG. 1, but the ribs are faintly visible. These ribs prevent the filter medium from seating directly against the inner face of the filter cover. Instead, they create an upper air space above the filter medium. Scallops in the ribs permit unimpeded airflow between air vents pierced through the filter cover and the full area of the filter medium.

The rim of the filter tray must stand above the outer face of the filter medium so that the air vents in the filter cover can open solely into the air space above the filter medium, i.e., the upper air space that lies between the outer face of the filter medium and the filter cover.

One function of the filter cover is to protect the filter medium against splashing by bodily fluids and other potentially harmful substances such as solvents and chemical reagents. For that purpose, it is desirable to limit the air vents to those portions of the filter cover that face generally to the side and back of the wearer.

Figure 2:
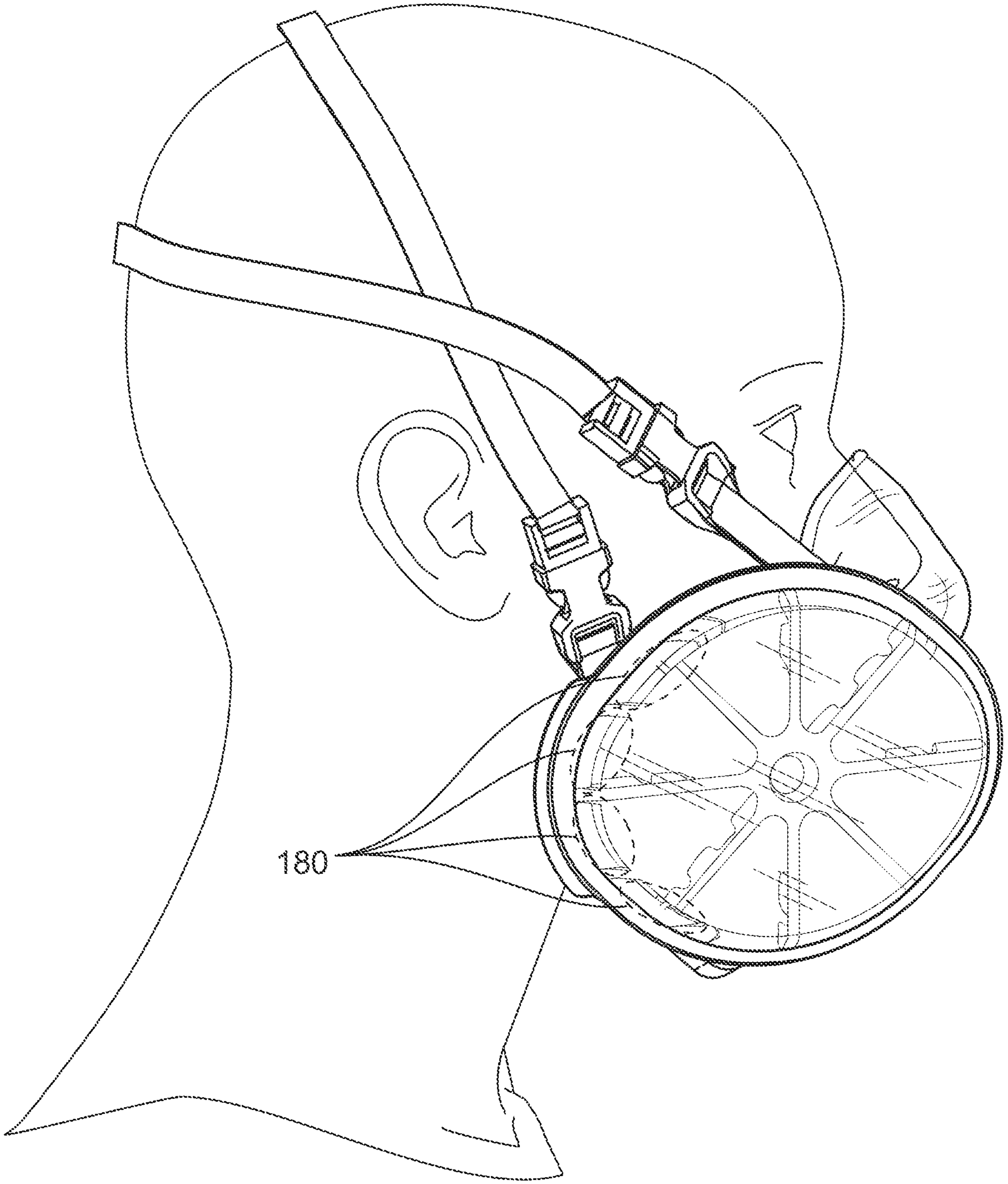
FIG. 2 is a side view of the example mask in place on a wearer's head. A filter cover is visible in the foreground.

FIG. 2 is a side view of the wearer's head showing the filter cover. Several air vents 180 are seen near the rear edge of the filter cover.

Turning back to FIG. 1, also seen in the exploded view is one of two filterports 190. In embodiments, the filterports are made of acetal plastic or polycarbonate, which are harder materials than thermoplastic polyurethane (TPU) and harder than the silicone used in current embodiments for the mask body. In examples, the filterports are formed by injection molding. These examples should not be understood as limiting, because other suitable materials and manufacturing techniques will be known to those skilled in the art.

Each filterport is used for assembling a filter tray to the mask body. The filterport has a through portion and a flange portion. The through portion is inserted through one of the filtration holes in the mask body from within the interior of the mask body. After insertion, the flange portion rests against the inner surface of the mask body. To effectuate a seal, the mask body can be formed with an integral gasket ring that circles the filtration hole. Although the gasket rings are hidden in the figure view, the outlines of a gasket ring 200 can be faintly seen on the lateral plane facing the viewer in the view of FIG. 1. In such an arrangement, the flange portion rests against the gasket ring and compresses it to make a firm seal when tightened in a manner to be described below.

After the through portion is inserted, it is locked to a filter tray by using a twist-lock mechanism. In our current embodiments, the twist-lock mechanism is a bayonet lock. However, other suitable twist-lock mechanisms may be used as alternatives. Possible alternatives include screw-tightening mechanisms and mechanisms aided by springs or other resilient members. To effectuate the locking of the two parts, each part is equipped with a locking fixture that engages in complementary fashion with the locking fixture on the other part. Accordingly, the filter tray is tightened into place by engaging the pair of locking fixtures and rotating the filter tray relative to the mask body. As noted above, the tightening action compresses the gasket ring and effectuates a seal on the inner face of the mask body.

The through portion of the filterport has a hollow interior that communicates with the central aperture of the filter tray for free flow of air between the filter tray and the interior of the mask body.

In a current embodiment, the left and right filterports are identical, but in order to orient the filter trays properly, the mounted orientation of the left filterport on the mask body is different from, but symmetrical to, the mounted orientation of the right filterport. In the current embodiment, the inner surface of the mask body has three integrally formed tabs on each side, arranged at equal angular separations around the filtration hole. When the filterport is assembled to the mask body, each of these tabs pushes through a corresponding slot on the flange portion of the filterport. These tabs aid the action of the twist lock by rotationally locking the filterport.

Figure 3:
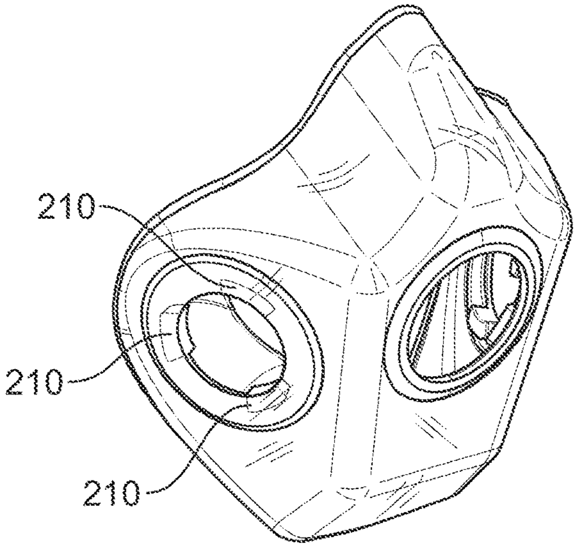
FIG. 3 is an external perspective view of the disassembled mask body showing the lateral and front-facing holes.
Figure 4:
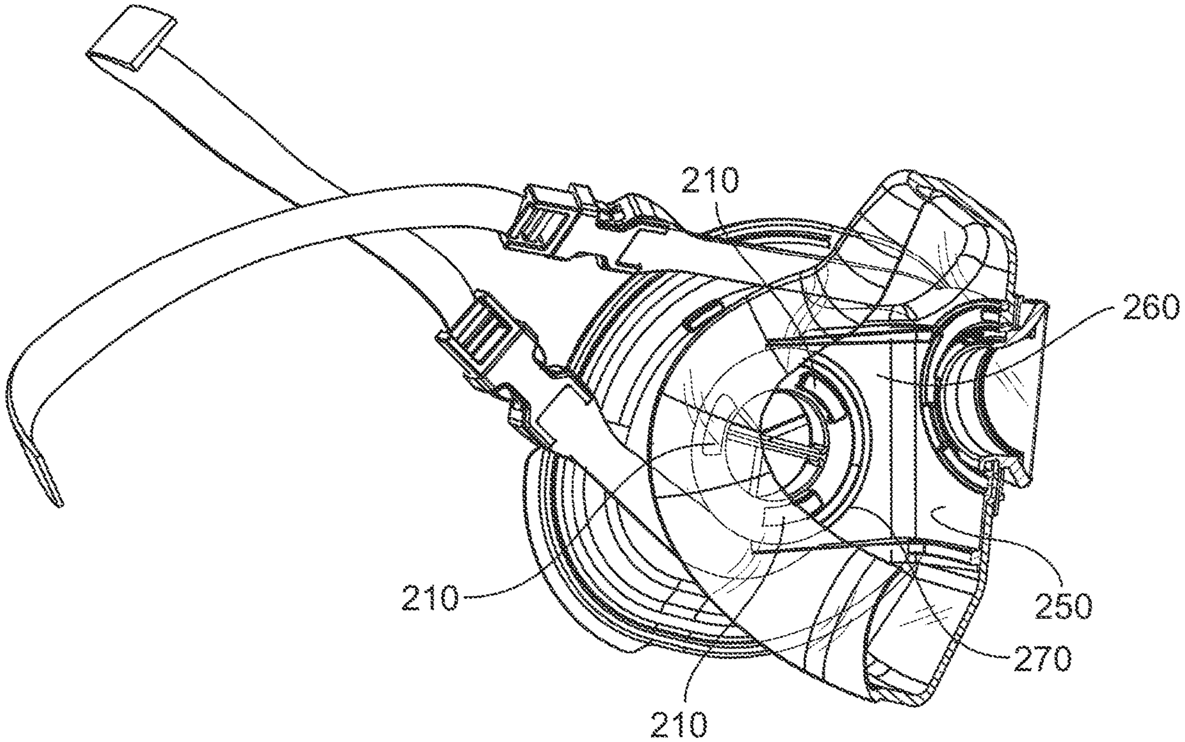
FIG. 4 is an internal perspective view of part of the assembled mask, showing the filter assembly.

The tabs 210 on the mask body are most easily apprehended from joint examination of FIGS. 3 and 4, which are, respectively, an external perspective view of the disassembled mask body showing the lateral and front-facing holes, and an internal perspective view of part of the assembled mask, showing the filter assembly. In the first view, the tabs are visible as ghost images through the thickness of the mask body. In the second view, the tabs are seen pushed through the slots in the filterport.

Figure 5A:
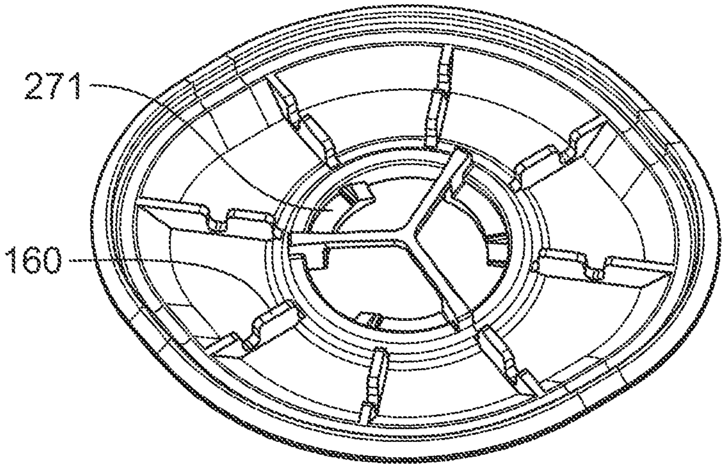
FIG. 5 provides perspective views of the mask tray from the top and from the bottom.
Figure 5B:
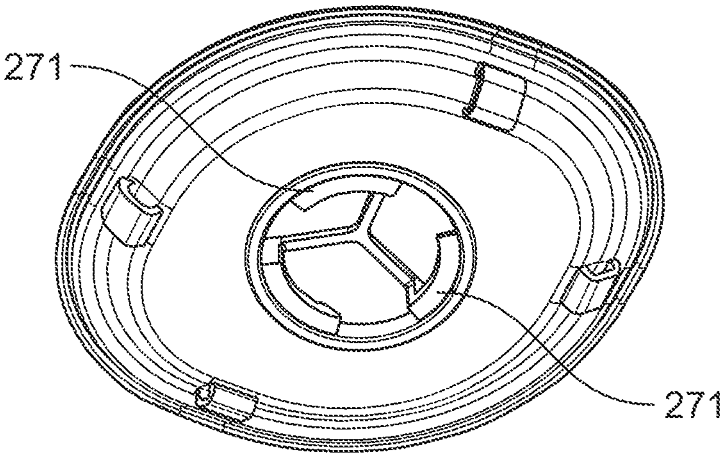

FIG. 5 provides perspective views of the mask tray from the top and from the bottom. A set of three circumferentially arranged tabs 271 for locking the filter tray to the filterport in a bayonet lock are visible in both views. A pattern of radial ribs 160 is also visible in the figure.

Figure 6:
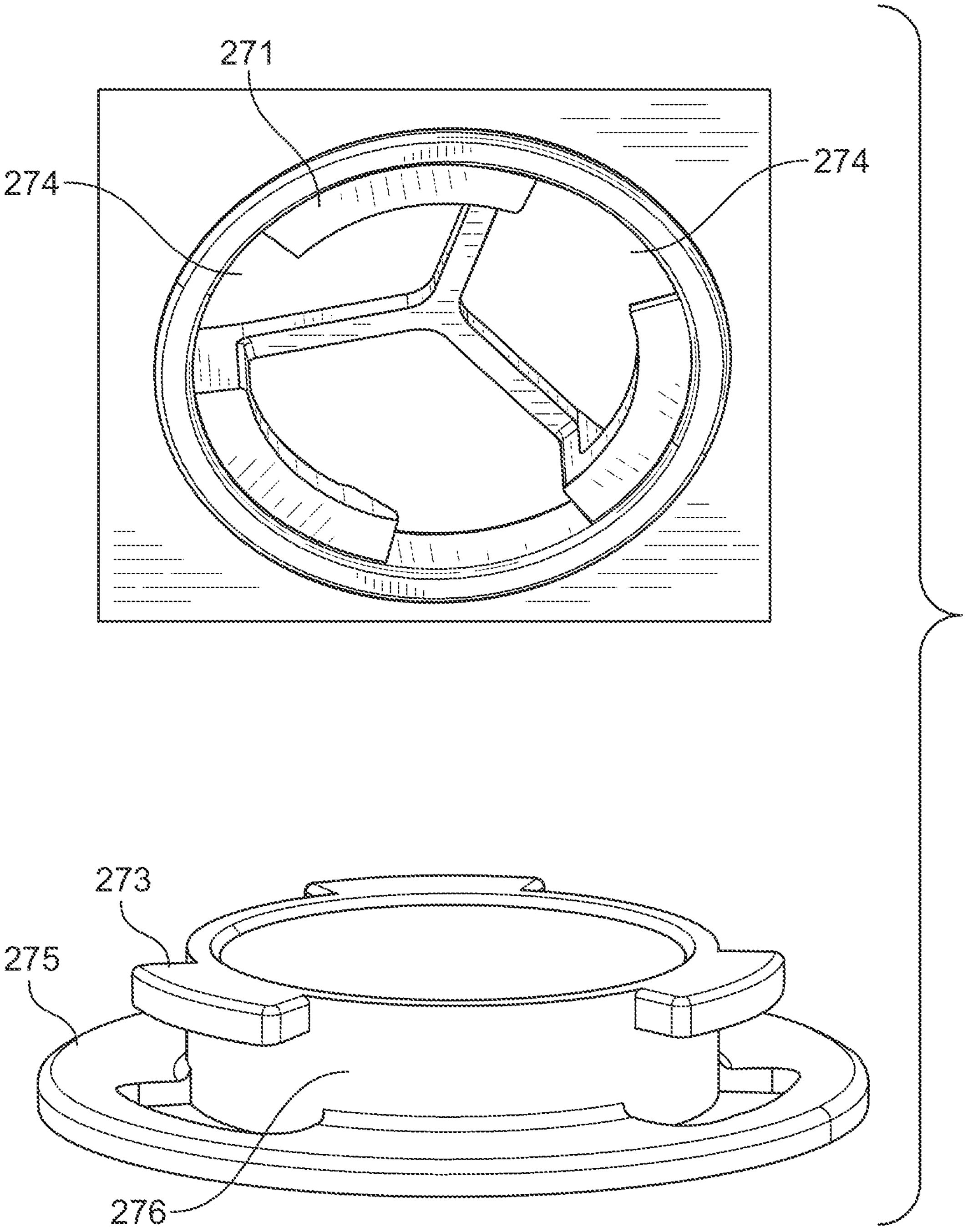
FIG. 6 provides a perspective view of a filterport.

FIG. 6 provides a perspective view of a filterport showing a set of three circumferentially arranged tabs 273 for locking the filter tray to the filterport in the bayonet lock. Above the filterport is a bottom view of the central portion of the filter tray, showing the three openings 274 for the locking tabs on the filterport. The flange portion 275 and through portion 276 of the filterport are also clearly shown in the figure.

Figure 7:
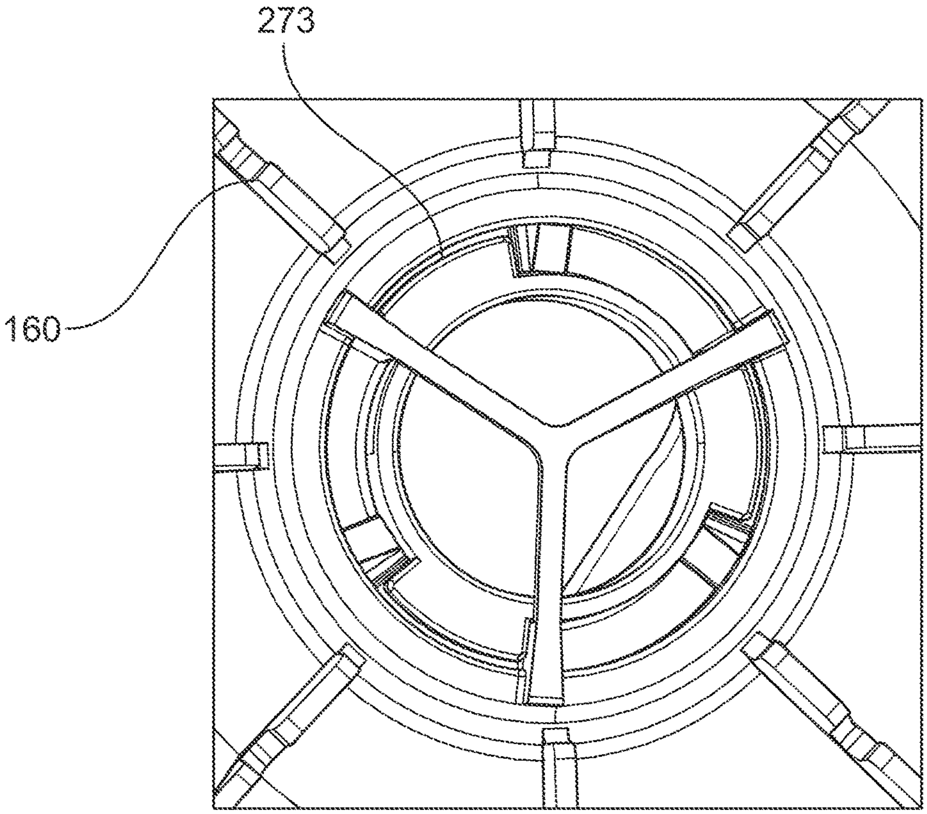
FIG. 7 is a detail view looking down through the center of the filter tray after it has been mated to the filterport for locking.

FIG. 7 is a detail view looking down through the center of the filter tray after it has been mated to the filterport for locking.

Figure 8:
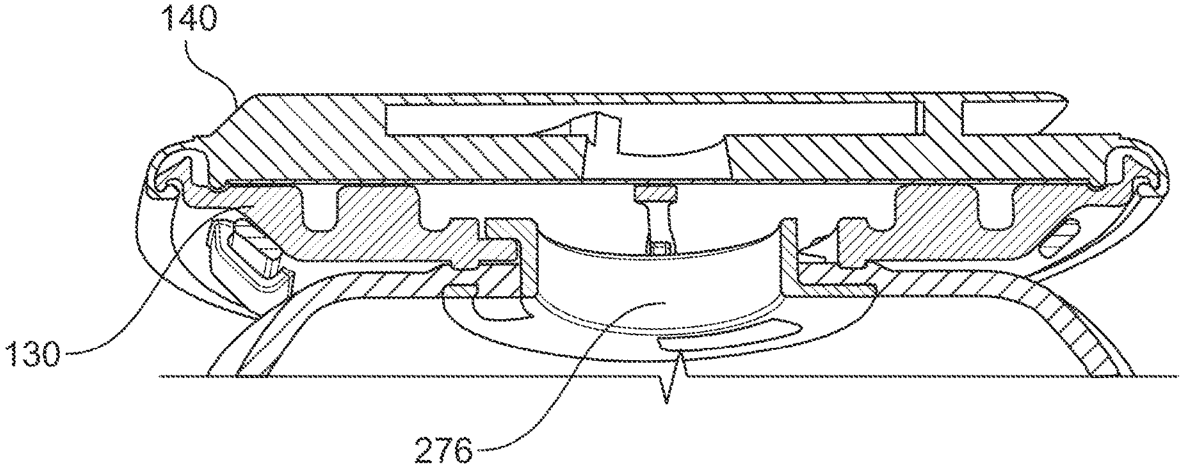
FIG. 8 is a sectional view showing the full filter tray assembly.

FIG. 8 is a sectional view showing the full filter tray assembly. As shown, the filterport through portion 276 extends to the exterior of the mask body and by means of the bayonet lock, it engages the filter tray 130, thereby clamping it in place. The filter cover 140 is also shown in the figure, with the edge of the filter cover wrapping around and engaging the rim of the filter tray.

Figure 9:
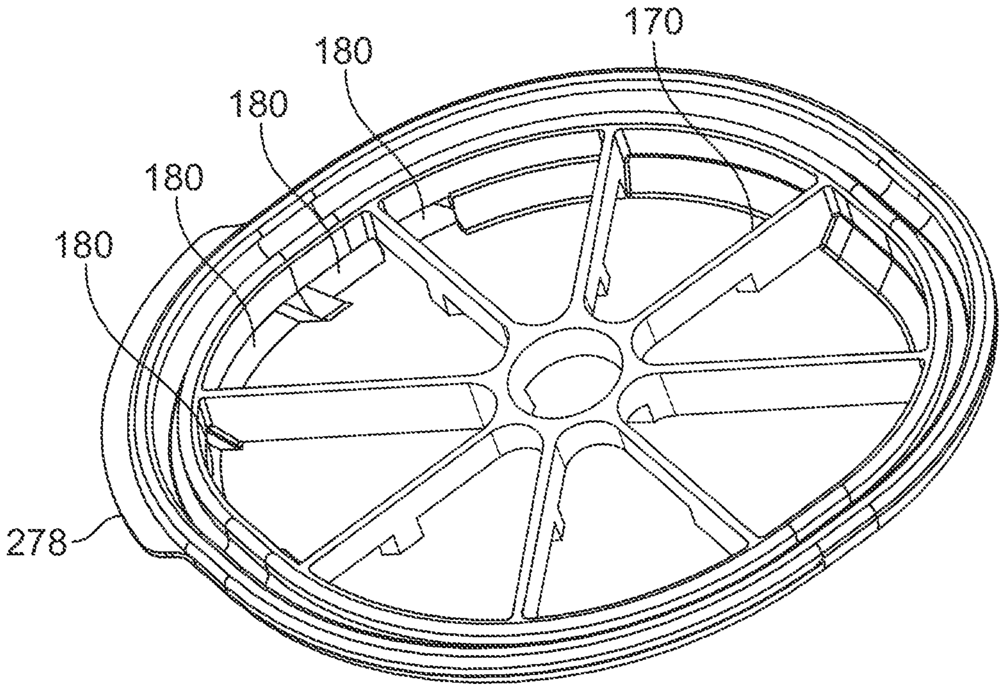
FIG. 9 shows an example filter cover in bottom-side perspective view.

FIG. 9 shows the example filter cover in bottom-side perspective view. The pattern of ribs 170 on the bottom side of the cover is clearly seen. In addition, a series of air vents 180 are visible in the figure. These air vents are cut out from the edge of the filter cover to permit airflow between the atmosphere and the upper surface of the filter medium. A tab 278 for easy removal is also seen projecting from the edge of the filter cover.

Referring back to FIG. 1, the mask further includes a voice diaphragm 220 and a front port in two parts. In the example embodiment described here, the two parts of the front port are referred to as phragmport A (element 230) and phragmport B (element 240). More generally, these parts may be referred to as the "unit A" and the "unit B".

In current embodiments, the two phragmports are made of acetal plastic or polycarbonate, which are harder materials than the silicone used in current embodiments for the mask body. In examples, the phragmports are formed by injection molding. These examples should not be understood as limiting, because other suitable materials and manufacturing techniques will be known to those skilled in the art.

The voice diaphragm has a central membrane portion and an outer, circumferential ring. The membrane is exemplarily made of silicone, although it can be made from any other suitable polymeric material, provided it can be made thin enough to intelligibly transmit the human voice while maintaining an airtight seal. The membrane thickness and/or the membrane tension can optionally be selected to highlight particular ranges of vocal frequencies.

The circumferential ring has a rim with a gripping feature, as will be described below. In example embodiments, the circumferential ring is made of acetal plastic, although other materials known in the art would also be suitable. Also, embodiments in which the circumferential ring and membrane are integrally made from the same material are not excluded. Sterilizability of the ring material is desirable, and it is also advantageous to make the ring from a material that can be formed by injection molding. Acetal plastic is such a material.

The membrane is advantageously made of a transparent material to permit visual observation of the wearer's lips. For the same purpose, it is advantageous to make the membrane large enough in diameter to afford a view of the wearer's lips even when fogging is present due to humidity within the mask.

In prototypes, we have found that a commercially available silicon stethoscope diaphragm can suffice for the voice diaphragm.

Phragmport A and phragmport B cooperate to facilitate attachment of the voice diaphragm to the mask body. Phragmport A (element 230) has a central aperture that aligns during assembly with the forward-facing hole in the mask body, and it has a flange portion that nests against the inner face of the mask body surrounding the forward-facing hole. This flange portion is described in further detail below. Phragmport A also has a locking fixture that engages in complementary fashion with a locking fixture on phragmport B, as will be described below.

Phragmport B (element 240) has a through portion that extends through the mask body from the outside. On the interior side of the mask body, a locking fixture on the through portion of phragmport B engages in complementary fashion with the locking fixture on phragmport A. Together, the two locking fixtures constitute a twist-lock mechanism. In current embodiments, this mechanism is a bayonet lock, although alternatives are also feasible, as explained above in regard to the filter trays and filterports.

Phragmport B also has a flange portion that nests against the outer face of the mask body in a region surrounding the forward-facing hole. Advantageously, the mask body is formed with an integral gasket ring on its outer face, surrounding the central hole. When the twist-lock mechanism for the phragmport elements is activated, the two phragmport elements are urged toward each other, thereby compressing the gasket ring and making a seal against the outer face of the mask body.

Figure 10:
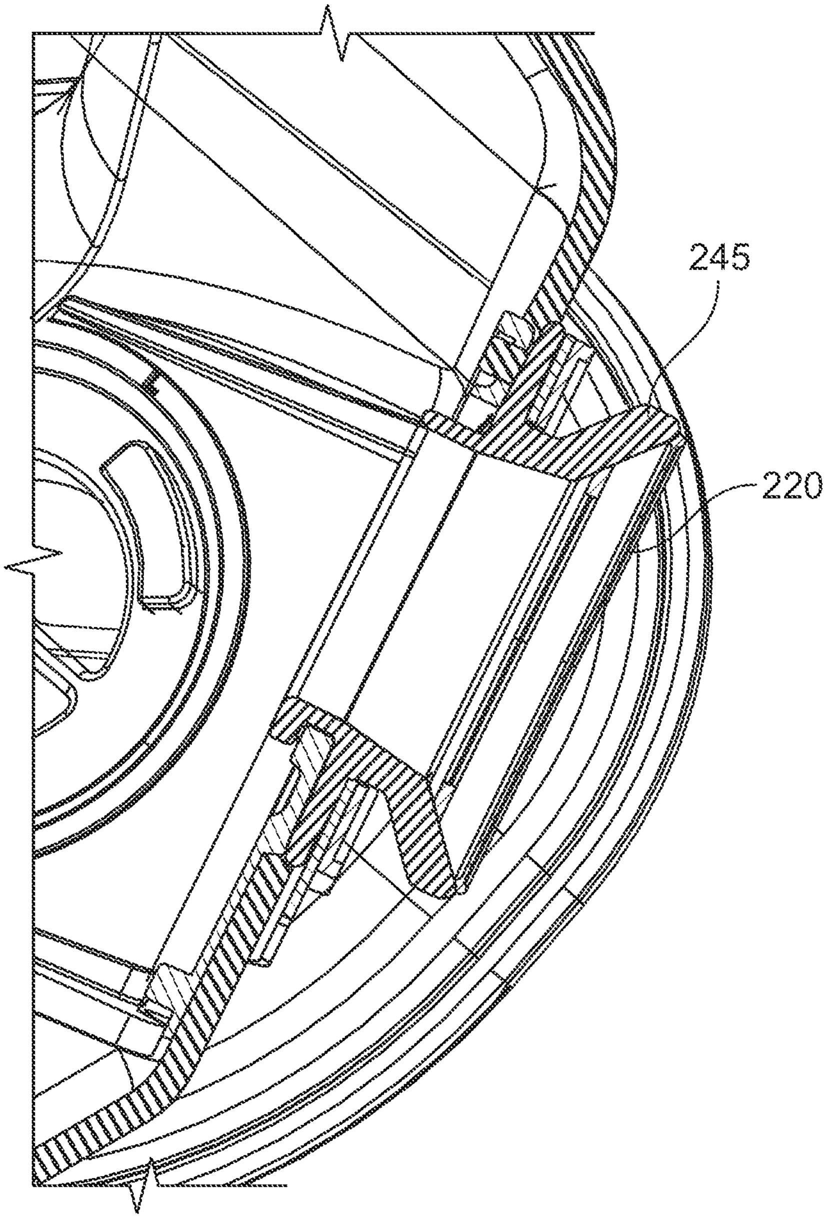
FIG. 10 is a partial cutaway view of the front portion of the mask in place on a wearer.

Above the flange portion (i.e., on the side facing away from the mask body), phragmport B terminates in a conical annulus 245 that serves as a socket to receive the voice diaphragm. The placement of the voice diaphragm in this socket is shown in FIG. 10, which is a detail of FIG. 13, discussed below.

The socket 240 for the voice diaphragm (which, as noted, is part of phragmport B) has a rim with a shape that is complementary to the gripping feature of the voice-diaphragm circumferential ring. During assembly, the voice diaphragm is placed over phragmport B, and the circumferential ring is engaged with phragmport B such that an airtight seal is formed between them. Seals of that kind are conventional for, e.g., sealing containers, and they need not be described here in further detail.

As explained above, phragmport A has a flange portion that nests against the inner face of the mask body surrounding the forward-facing hole. The flange portion can also be conformed to provide rigidity and mechanical stability to the mask.

For example, the flange portion in the embodiment shown in FIG. 1 has a left panel, a right panel, and a middle panel that surrounds the forward facing hole. In the middle panel, there is a generally quadrilateral extension that lies flat against the inner face of the mask body between the bottom of the forward-facing hole and the top edge of the chin-receiving portion of the mask body. The left and right panels are turned at angles relative to the central portion so that the left panel lies flat against the lateral plane on the left side of the mask body, and the right panel lies flat against the other lateral plane, on the right side of the mask body.

This arrangement is best seen in FIG. 4, which is a view into the interior of the mask, with the viewer's line of sight directed generally toward one of the filterports. One half of the phragmport A flange portion is cut away, so that half of the middle panel 250 and one of the side panels 260 are in view. In the embodiment that is shown, the side panel terminates, distal the middle panel, in a curved edge that matches and nests against the outer circumference 270 of the adjacent filterport. The opposing side panel, which is not shown in FIG. 4, similarly nests against the outer circumference of the opposing filterport.

The above arrangement provides mechanical stability to the mask. It is especially advantageous when the mask body is made of a pliant material that, although sealing well against the wearer's face, lacks sufficient rigidity to maintain a functional shape during use.

The arrangement shown in FIG. 4 offers a further advantage. Turning back to FIG. 1, it will be seen that the tension in the head straps is transferred by the clip assembly to a force on an annular region of the mask body surrounding the forward-facing hole. The phragmport-A flange portion prevents the mask body from deforming under this force. Instead, the flange portion distributes the force across the front of the mask, and by engaging the filterports, it also transfers a portion of the force to the sides of the mask. In that manner, the mask body is uniformly urged toward the wearer's face.

As noted above, the clip assembly transfers the tension in the head straps to a force on an annular region of the mask body surrounding the forward-facing hole. The head straps clip in a conventional manner onto sockets on the clip assembly. An example is shown in FIG. 1. The head straps are conventional and need not be described here in further detail.

Figure 11:
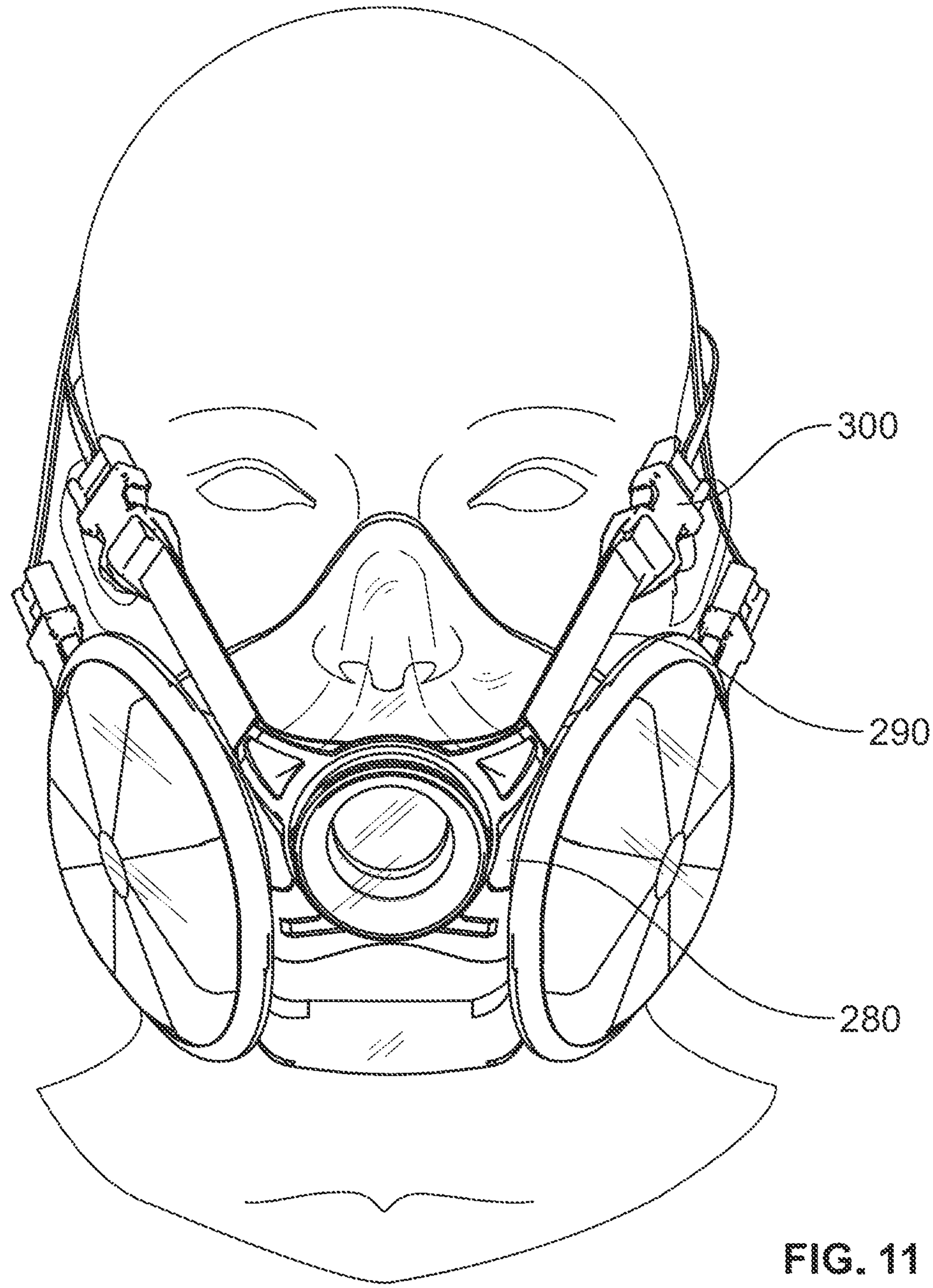
FIG. 11 is a frontal view of the mask in place on a wearer.

The attachment of the clip assembly onto the mask body is best understood with reference to the frontal view of FIG. 11. In the embodiment shown in FIG. 11, the clip assembly has a mid-portion 280 with four corners, and radiating from each corner, an elongated, pliant stub 290 terminated with a socket 300 for clip attachment. In current embodiments, the clip assembly is made of TPU, although other suitable materials will be known to those skilled in the art. One advantage of making the clip assembly of TPU is that it can readily be formed by injection molding.

The mid-portion is formed around a central aperture aligned with the forward-facing hole in the mask body. As best understood from joint reference to FIG. 1 and to FIG. 11, which is a frontal view of assembled mask in-place on a wearer, the mid-portion is placed over the distal part of phragmport B and nests against the outer face of the phragmport-B flange portion. As seen in the same figures, the voice diaphragm is mounted onto the distal part of phragmport B after the clip assembly is already in place.

Figure 12:
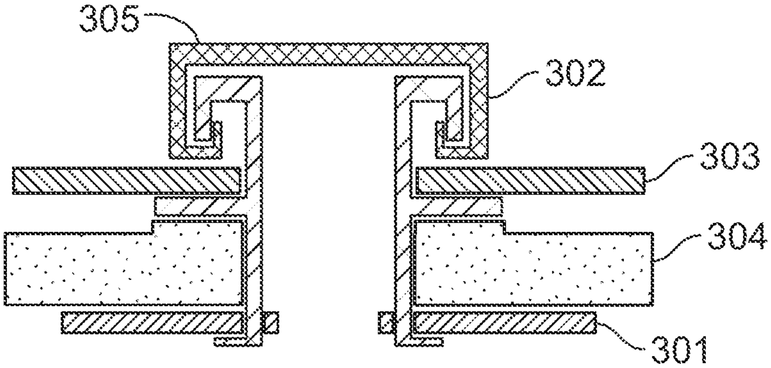
FIG. 12 is a notional diagram, not drawn to scale, provided to convey a better understanding of how phragmports and a clip assembly can be attached to the mask body in the example embodiment. It should be noted that FIG. 12 is provided purely as a pedagogical aid and is not to be understood as limiting in any respect.

FIG. 12 is a notional diagram, not drawn to scale, provided to convey a better understanding of how the phragmports 301, 302 and clip assembly 303 can be attached to the mask body 304. As shown in the figure, phragmport B (element 302) has been inserted, and at the inner face of the mask body, it has been engaged with phragmport A (element 301). The clip assembly has been placed over the distal end of phragmport B and seated so that it rests against the outer face of the phragmport B flange portion. Above the clip assembly, the voice diaphragm 305 has been placed in sealing position over the terminal portion of phragmport B, and its rim has engaged with the rim of phragmport B.

To avoid making it unduly difficult for the wearer to breathe, and in extreme cases to avoid hypercapnia, it is important to provide a low-resistance path for airflow between the atmosphere and the interior of the mask. As explained above, such a path is provided, in part, by using rib patterns within each filter tray to suspend the filter medium between upper and lower air spaces. Ample space can also be provided within the mask body for low-resistance airflow.

Figure 13:
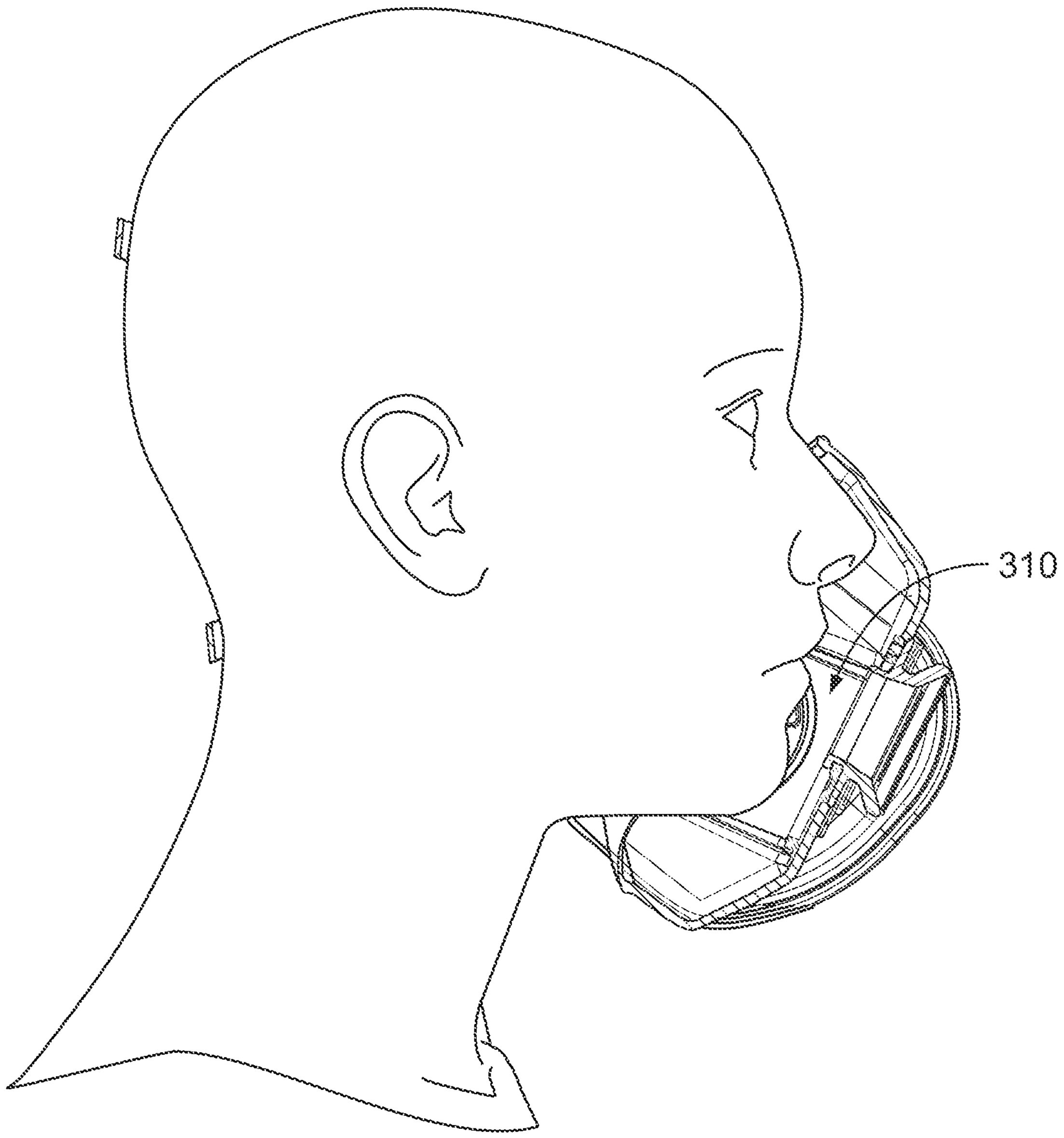
FIG. 13 is a cutaway profile view of the example mask in place on a wearer.
Figure 14:
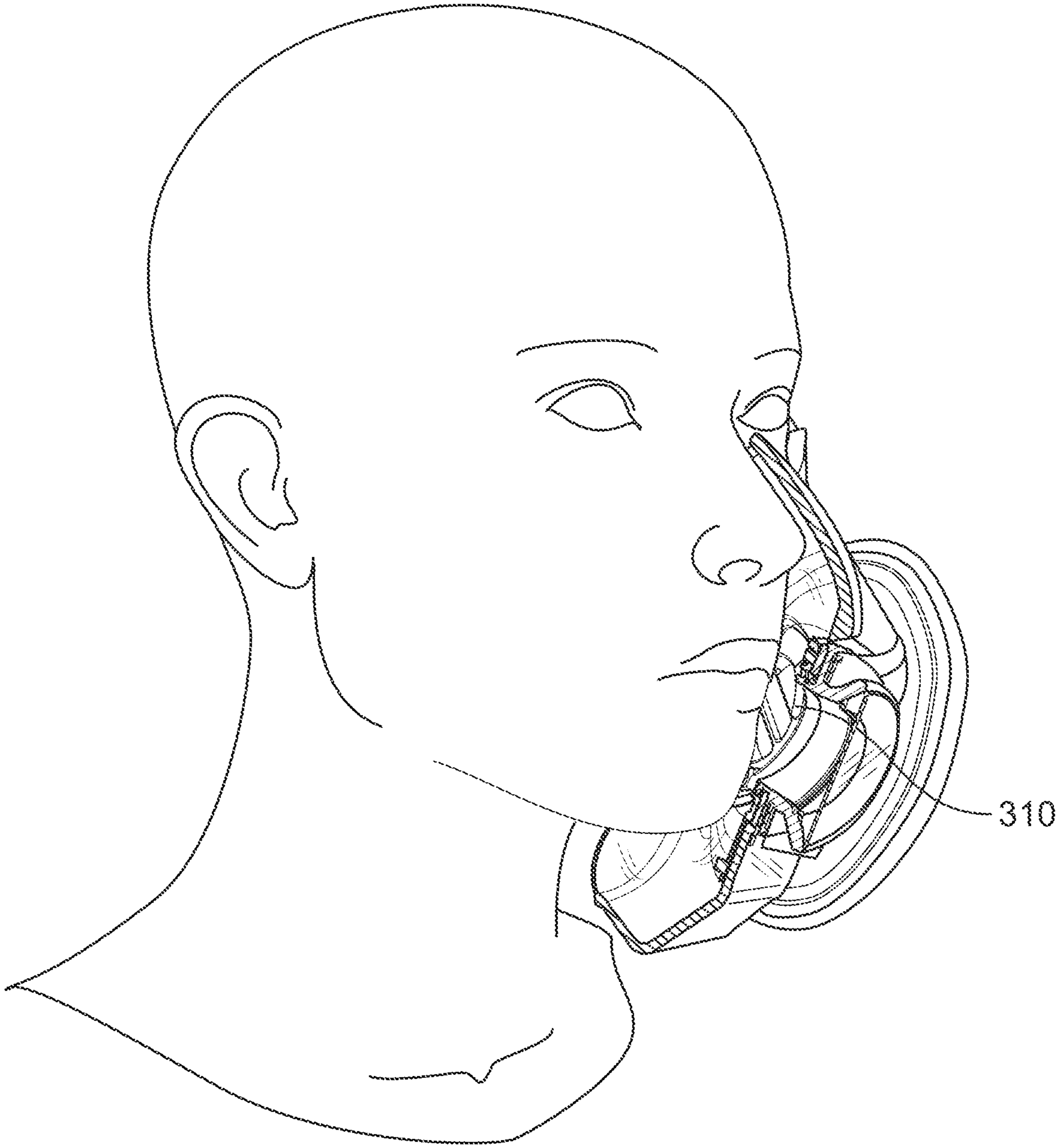
FIG. 14 cutaway three-quarter view of the example mask in place on a wearer.

For example, the cutaway profile view of FIG. 13 and the cutaway three-quarter view of FIG. 14 show an air-filled cavity 310 that extends vertically from at least the point of the wearer's nose to the point of the wearer's chin, and that extends laterally in an arc that extends almost to the wearer's cheekbones.

The wearer's chin rests on a pad that is integral with the rest of the mask body. In trials using NIOSH head models, we have found that a greater variety of head sizes and shapes can be accommodated by a single mask size when the chin pad is made somewhat large, relative to what is generally seen in commercially available masks.

The area provided for the filter medium and the cross-sectional area of the filter port are also factors affecting the amount of airflow. Example values used in our prototypes, by way of example, are 28 mm for the filterport diameter, 1231.5 $mm^2$ for the combined area of both filterports, and 13,000 $mm^2$ for the total filter area over both filter trays combined.

Figure 15:
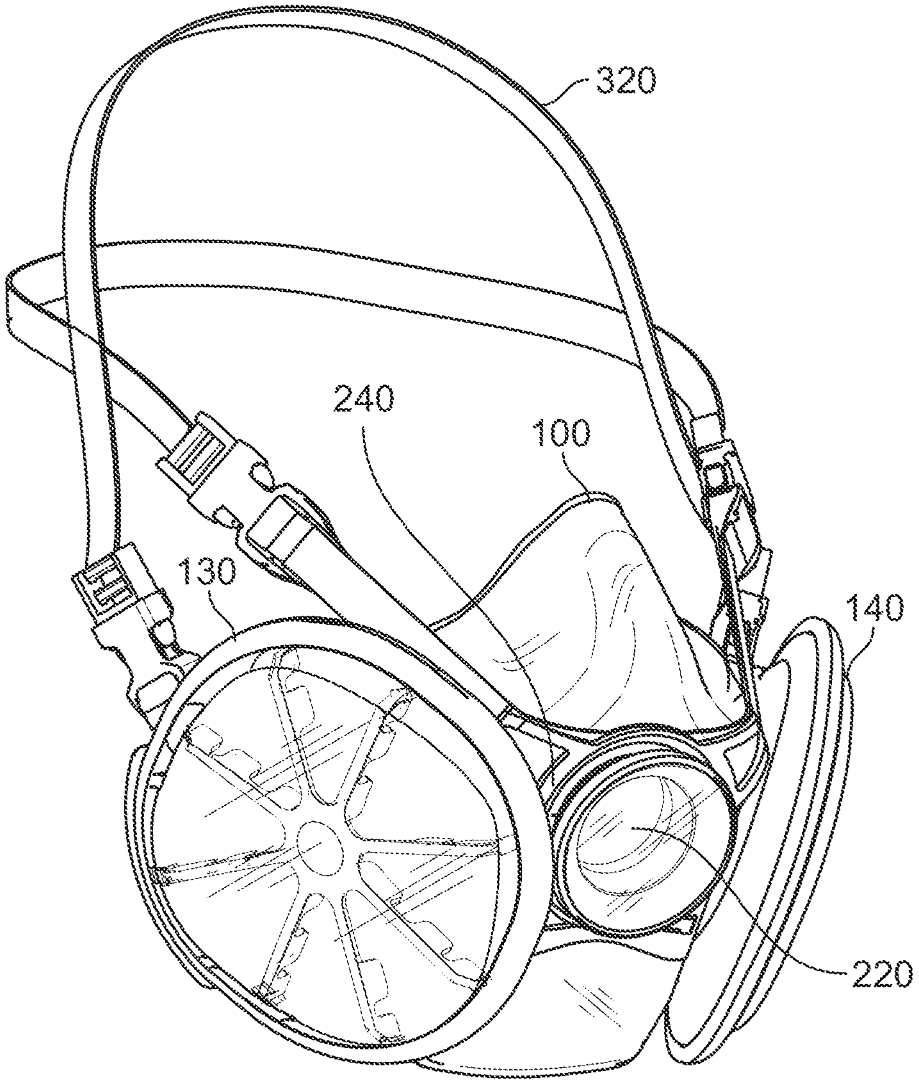
FIG. 15 is a three-quarter view of the mask as it would appear in use, but with the wearer's head omitted.

FIG. 15 provides a three-quarter view of the mask in our example embodiment as it would appear in use, but with the wearer's head omitted. The figure provides a clear view of one possible arrangement of head straps 320. This arrangement is provided for illustrative purposes only and is not intended to be limiting. Any of various head-strap arrangements known in the art could be used in place of the arrangement that is shown.

One of the advantages of our design is that the speech diaphragm can be removed for substitution of a fit-test apparatus, an exhaust valve, or other desired attachments. Another advantage is the protection provided by the filter covers against contamination of the filter medium.

A further advantage is that there is no limit on the kinds of filter media that can be used, provided only that they can fit within the volume limitations of the filter tray and filter cover. It is noteworthy in this regard that a range of covers can be provided to accommodate filter media of different thicknesses. For a given filter cover, however, the thickness of the filter medium will be limited by the flexible range of the filter cover. That is, although a filter cover of TPU, for example, will flex outward to accommodate a range of thicknesses, TPU or any other material will still have an elongation limit.

Yet another advantage is that the mask can be fully disassembled into discrete parts for cleaning, decontamination, and sterilization. Still another advantage is that all of the component parts can be made of materials that are sufficiently heat-resistant to allow autoclave sterilization.

The mask can be provided in assembled form, or alternatively, it can be provided as a disassembled kit to be assembled as needed. Embodiments in any state of assembly or disassembly are considered to lie within the scope of the invention.

We claim:

1. A protective face mask, comprising:
- a mask body of elastomeric material, the mask body pierced through by two symmetrically placed filtration holes, the mask body including:
  - two integrally formed gasket rings, a corresponding one of the two integrally formed gasket rings located around a corresponding one of the two filtration holes on an outer surface of the mask body; and
  - two filterports, a corresponding one of the two filterports located adjacent a corresponding one of the two filtration holes, each filterport including:
    - a corresponding flange portion adapted to sealingly nest against an inner surface of the mask body; and
    - a corresponding through portion adapted to protrude through a corresponding one of the two filtration holes from inside to outside the mask body, each through portion including a corresponding port twist-lock mechanism; and
- two filter assemblies, each filter assembly including:
  - a filter media adapted to filter a flow of air into the mask body and a flow of air from the mask body;
  - a filter tray including:
    - a tray twist-lock mechanism adapted to reversibly engage with a corresponding port twist-locking mechanism, wherein when the tray twist-lock mechanism is engaged with a corresponding port twist-lock mechanism the filter tray compresses a corresponding integrally formed gasket ring;

a plurality of tray ribs standing proud of an inner face of the filter tray thereby forming a lower air space between the filter media and the inner face of the filter tray; and a rim around a periphery of the filter tray; and a filter cover adapted to engage the rim of the filter tray with the filter media there between, the filter cover including:

a plurality of filter cover ribs standing proud of an inner face of the filter cover thereby forming an upper air space between the filter media and the inner face of the filter cover; and a plurality of air vents formed through the filter cover and adapted to allow the flow of air into the mask body and the flow of air from the mask body, the plurality of air vents located along a rear edge of the filter cover, thereby the plurality of air vents is configured to face a side or a back of a wearer during use;

wherein:

each of the mask body, the filter trays, the filter covers, and the filterports are a corresponding discrete part of the protective face mask; and the protective face mask is adapted to be repeatedly assembled from the discrete parts and disassembled into the discrete parts.

2. The protective face mask of claim 1, wherein the mask body, the filter trays, the filter covers, and the filterports are assembled together.

3. The protective face mask of claim 1, wherein the mask body, the filter trays, the filter covers, and the filterports are provided as a kit for assembly.

4. The protective face mask of claim 1, wherein:

the mask body is further pierced through by a forward-facing hole;

the protective face mask further comprises an A-unit and a B-unit that, together, constitute a forward port;

the A-unit has a flange portion adapted to nest against the inner surface of the mask body;

a twist-locking fixture-A on the A-unit and a complementary twist-locking fixture-B on the B-unit are reversibly engageable and, together, constitute a forward twist lock;

the forward twist lock is conformed such that during assembly of the B-unit to the mask body, engagement of the twist-locking fixture-A with the twist-locking fixture-B followed by relative rotation between the twist-locking fixture-A and the twist-locking fixture-B urges the B-unit toward the mask body.

5. The protective face mask of claim 4, wherein the mask body, the filter trays, the filter covers, the filterports, the A-unit, and the B-unit are assembled together.

6. The protective face mask of claim 4, wherein the mask body, the filter trays, the filter covers, the filterports, the A-unit, and the B-unit are provided as a kit for assembly.

7. The protective face mask of claim 4, further comprising a speech diaphragm that forms a seal over an open, forward-facing end of the B-unit.

8. The protective face mask of claim 7, wherein the speech diaphragm has a rim that reversibly engages the open, forward-facing end of the B-unit.

9. The protective face mask of claim 4, wherein:

the B-unit comprises a flange portion that nests against the outer surface of the mask body around the forward-facing hole;

the B-unit further comprises an annular portion that is distal to the mask body;

the protective face mask further comprises a harness having four attachment points and a clip stub projecting from each attachment point, the harness and clip stubs collectively constituting a clip assembly;

each of the clip stubs comprises a pliant, elongate member terminated by a clip for attachment of a head strap and the harness has a central opening adapted to fit around the annular portion of the B-unit.

10. The protective face mask of claim 9, wherein the central opening of the harness is smaller in diameter than the flange portion of the B-unit such that, upon assembly, the harness at least partially covers said flange portion of the B-unit.

11. The protective face mask of claim 4, wherein the flange portion of the A-unit has a middle panel and two side panels, each side panel is bent at an angle relative to the middle panel, the middle panel nests against a front portion of the mask body, and the side panels nest against side portions of the mask body.

12. The protective face mask of claim 11, wherein, distal the middle panel, each side panel terminates in a corresponding arcuate edge that nests against a corresponding stop that is concentric with a corresponding one of the filtration holes.

13. The protective face mask of claim 12, wherein each of the stops is constituted by a corresponding one of the filterports.

14. The protective face mask of claim 1, wherein each of the mask body, the filter trays, the filter covers, and the filterports is adapted to be sterilized by an autoclave process.

15. The protective face mask of claim 1, wherein each of the mask body, the filter trays, the filter covers, and the filterports is formed of silicone.

* * * * *